(12) United States Patent
Kimble

(10) Patent No.: US 6,439,355 B1
(45) Date of Patent: Aug. 27, 2002

(54) ELECTROMAGNETIC SPRING-ACTUATED BRAKE SYSTEM

(75) Inventor: Michael E. Kimble, Lawrenceville, PA (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 09/739,598

(22) Filed: Dec. 18, 2000

(51) Int. Cl.$^7$ ............................................. B60T 13/04
(52) U.S. Cl. ..................... 188/171; 188/161; 188/73.45
(58) Field of Search ................................. 188/171, 173, 188/73.45, 216, 72.3, 161, 156, 158, 73.44, 73.32, 73.33, 73.34; 303/71; 335/78, 177; 310/77, 12; 187/359

(56) References Cited

U.S. PATENT DOCUMENTS

| | | |
|---|---|---|
| 1,629,781 A | 5/1927 | Dodd |
| 3,357,528 A | 12/1967 | Verlinde ..................... 188/171 |
| 3,833,102 A | 9/1974 | Stähle ..................... 192/111 A |
| 3,983,971 A | 10/1976 | Kawai ......................... 188/171 |
| 4,445,596 A | * 5/1984 | Waters et al. ................ 188/171 |
| 4,684,838 A | 8/1987 | Casanova ..................... 310/93 |
| 5,101,939 A | 4/1992 | Sheridan ..................... 188/171 |
| 5,154,261 A | 10/1992 | Tanaka et al. ............... 188/171 |
| 5,186,286 A | 2/1993 | Lindberg ..................... 188/171 |
| 5,199,532 A | 4/1993 | Suganuma et al. ........... 187/80 |
| 5,253,738 A | 10/1993 | Vertesy et al. ............... 188/171 |

* cited by examiner

Primary Examiner—Douglas C. Butler
(74) Attorney, Agent, or Firm—Drinker Biddle & Reath LLP (57) ABSTRACT

An electromagnetic brake system is disclosed for controlling motion of a component that is movable relative to the brake system. The system includes a magnet body mounted to a support and having at least one electrically controlled magnetic device on it for generating a magnetic force when activated. A back plate is mounted adjacent to the magnet body on one side of a movable component. An armature plate is located between the magnet body and the movable component. At least one spring is located on the magnet body between the magnet body and the armature plate for biasing the armature plate away from the magnet body. The spring has a spring force that is less than the magnetic force of the magnetic device such that activation of the magnetic device urges the armature plate toward the magnet body, overcoming the spring force.

48 Claims, 8 Drawing Sheets

ELECTROMAGNETIC SPRING-ACTUATED BRAKE SYSTEM

FIELD OF USE OF THE INVENTION

The present invention relates to braking systems and, more specifically, to a spring-applied braking system with an electromagnetic release mechanism.

BACKGROUND OF THE INVENTION

Braking systems have been around for many years and are used in various types of devices for stopping or slowing down a moving component. Probably one of the best known braking systems is a caliper-type braking system used on car brakes. The system typically includes two brake pads positioned on opposite sides of a rotating disc. The disc is slowed or stopped by hydraulically driving the brake pads toward the disc until they contact it. This type of hydraulic caliper disc system has been around for decades. One conventional caliper-type disc brake that can be used in an elevator is disclosed in U.S. Pat. No. 5,101,939.

Another type of conventional braking system uses an electromagnetic brake for stopping or slowing down a disc or rail. In this type of brake, electromagnetic energy is used to stop the rotating or moving component. One type of conventional of braking system that uses an electromagnetic brake is disclosed in U.S. Pat. No. 5,186,286. A disc brake using electromagnetic force in an elevator is disclosed in U.S. Pat. No. 5,154,261.

Most conventional braking systems must be physically activated or actuated in order to produce braking. For example, in a car disc brake, the brake is not automatically applied while the car is in motion. Instead, the brake is manually engaged when it is desired to stop the car by applying pressure to the brake pedal. There are, however, applications where it is advantageous or necessary for the brake be engaged by default. One example is an elevator. Due to safety concerns, it is advantageous that the brake is applied by default at all times. In these types of braking systems, in order to move the elevator car the brake must first be disengaged, thus assuring that a system failure automatically stops the elevator.

While there have been many braking systems developed over the years, a need still exists for an improved system which is relatively inexpensive to manufacture and provides quick and reliable braking in the event of a power failure.

SUMMARY OF THE INVENTION

The present invention relates to an electromagnetic brake system for controlling motion of a component that is movable relative to the brake system. The brake system includes a magnet body mounted to a support. The magnet body has at least one electrically controlled magnetic device mounted to it which is adapted to generate a magnetic force when activated.

A back plate is mounted adjacent to the magnet body and positioned on one side of a movable component. The back plate preferably includes a brake shoe positioned adjacent to the movable component.

An armature plate is located adjacent to the magnet body and positioned between the magnet body and the movable component. The armature plate is movable relative to the magnet body. A brake shoe is located on the armature plate facing the movable component.

At least one spring is located on the magnet body between the magnet body and the armature plate for biasing the armature plate away from the magnet body. The spring has a spring force that is less than the magnetic force generated by the magnetic device such that activation of the magnetic device moves the armature plate toward the magnet body overcoming the spring force.

A manual release mechanism is preferably mounted to the magnet body for manually controlling the translation of the armature plate toward the magnet body.

In one embodiment of the invention, the magnetic force is varied to reduce the force applied to the armature plate when the brake is released. This is achieved in one configuration by using multiple coils and turning off at least one when the brake is released. In another configuration the current supplied to the coil is varied to control the resulting magnetic force.

Preferably the magnet body and back plate are pivotally mounted to the support such that these components can be pivoted away from the movable component to permit maintenance.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE DRAWINGS

Figure 1:
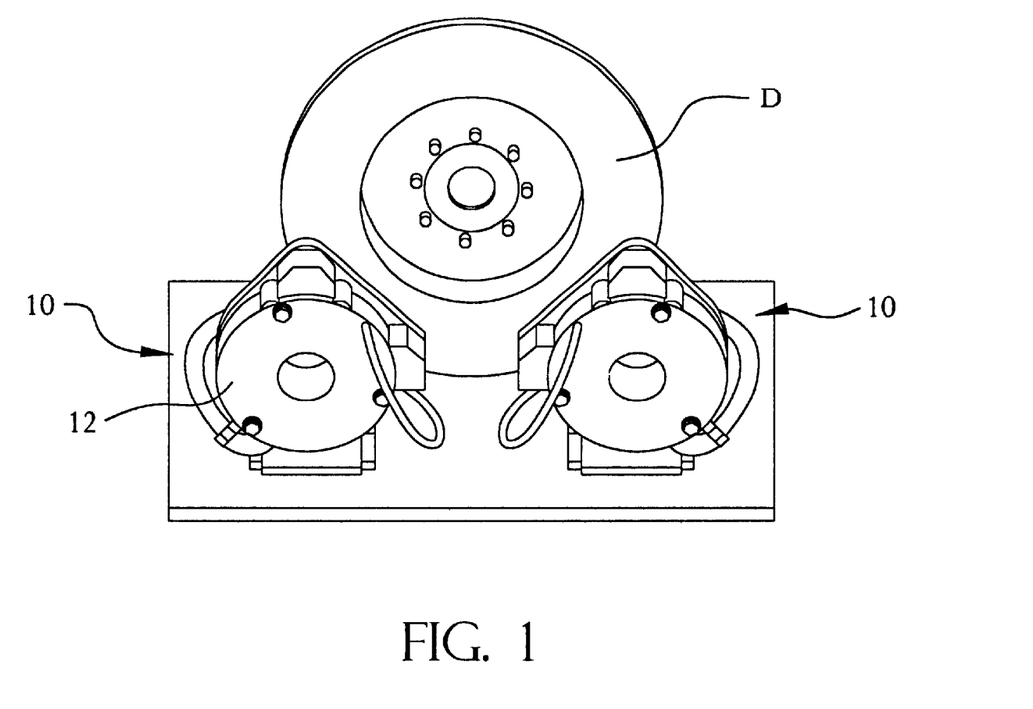
FIG. 1 is an isometric view of one embodiment of the electromagnetic brake system illustrating the brake system mounted adjacent to a rotating disc.

Referring to the drawings, wherein like reference numerals illustrate corresponding or similar elements throughout the several views, FIG. 1 is an isometric view of one embodiment of the electromagnetic brake system 10 according to the present invention. It is contemplated that the electromagnetic brake system 10 of the present invention can be configured to provide braking for a wide variety of moving components. Thus, while the following discussion and accompanying illustrations relate primarily to the use of the invention for stopping a rotating disc or a vehicle translating along a rail, the present invention can be adapted to other types of moving devices. Also, certain terms are used herein to generally refer to components. For example, the term "screw" is intended to cover any type of attachment device, such as screw, bolt, threaded rod, etc.

In the illustrated embodiment, there are actually two electromagnetic braking systems 10 shown mounted in combination with a disc brake D. Although two are shown, a braking system according to the present invention can be made with one or more electromagnetic brakes. The electromagnetic brake system includes a magnet body 12 which includes a electrically controllable magnet as will be discussed in more detail below.

Figure 2:
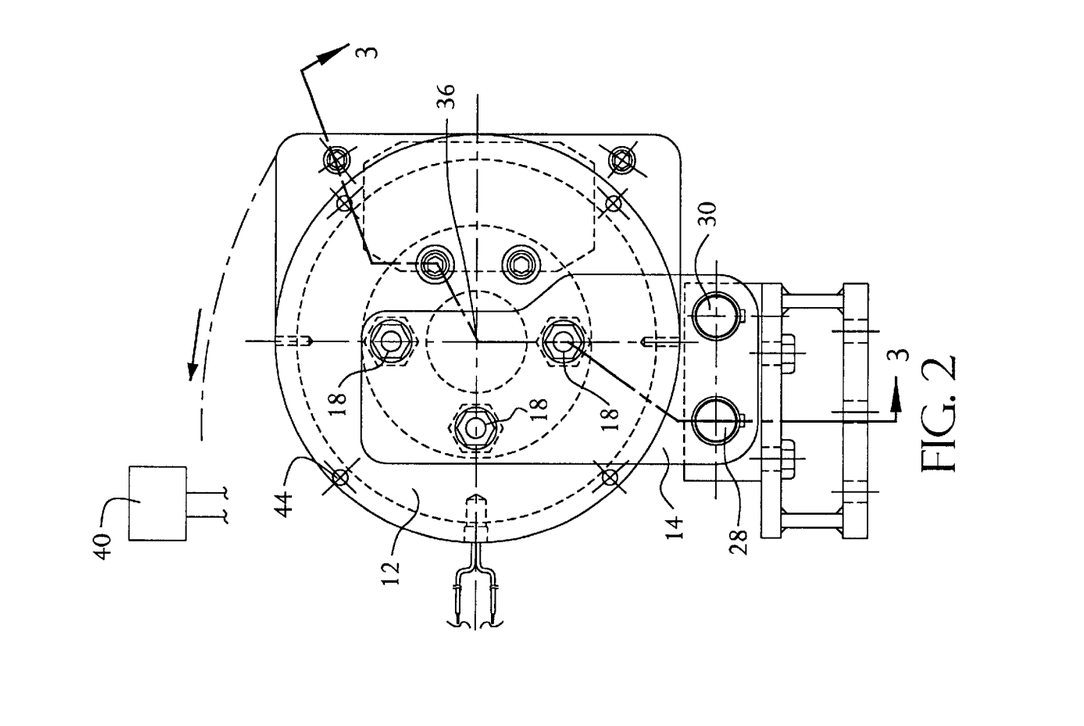
FIG. 2 is a front view of the electromagnetic brake system according to one embodiment of the present invention.
Figure 3:
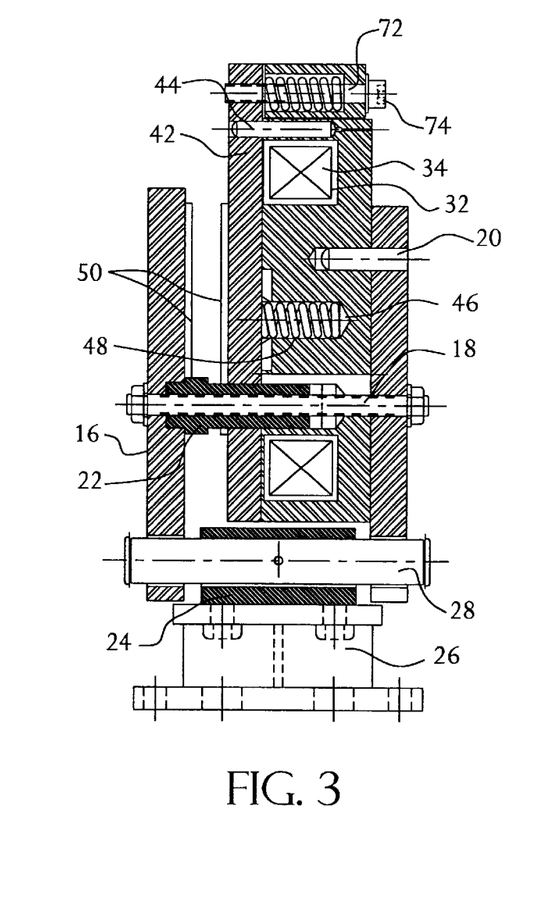
FIG. 3 is a cross-sectional view of the electromagnetic brake system taken along lines 3—3 in FIG. 2.

FIGS. 2 and 3 illustrate one embodiment of the electromagnetic brake in more detail. In particular, FIG. 2 is a front view of one embodiment of the electromagnetic braking system 10 and FIG. 3 is a cross-sectional view of the electromagnetic braking system taken along lines 3—3 in FIG. 2. The electromagnetic braking system 10 includes a mounting plate 14 which is attached to the magnet body 12 and preferably to a back plate 16. As will be become more apparent below, when mounted to a disc, rail or other moving component, the back plate 16 is typically positioned on one side of the disc or rail and the magnet body 12 and mounting plate 14 are positioned on the other side. The attachment of the mounting plate 14 to the magnet body 12 can be through any conventional means know to those skilled in the art. In the illustrated embodiment, the magnet body 12 is attached to the mounting plate 14 with one or more bolts 18. Locating pins 20 can be used to help position the magnet body 12 on the mounting plate 14.

The back plate 16 is also preferably attached to the mounting plate 14. As shown, the bolts 18 extend though the magnet body 12 and attach to the back plate 16. Adjustable spacers 22 can be incorporated into the design to maintain a desired spacing between the back plate 16 and the magnet body 12 in order to accommodate the disc or rail. By utilizing spacers 22 that can be easily adjusted, the electromagnetic braking system 10 can be readily tailored to different thickness discs and/or rails. Preferably the adjustable spacers 22 are adjustable screw spacers that provide spacing adjustment by rotating a screw or bolt head. In the illustrated embodiment, the adjustable screw spacer 22 is threaded into a portion of the magnet body 12 and contacts the back plate 16. Adjustment of the spacer varies the distance between the magnet body 12 and the back plate 16. The spacers 22 are also important for absorbing some of the shear force generated by the contact between the brake shoes and the moving component, thus reducing the amount of shear stress applied to the threaded bolt 18. Those skilled in the art would be readily capable of substituting various other types of adjustable spacers into the present invention.

In the illustrated embodiment, the mounting plate 14 and back plate 16 are attached to a mounting block 24 which, in turn, is attached to a support structure 26 through any conventional means. Alternately, the mounting block 24 can be formed as an integral part of the support structure 26. As shown, the mounting plate 14 and back plate 16 are preferably removably attached to the mounting block 24. More preferably, the two components are attached to the mounting block 24 such that the mounting plate 14 and back plate 16 can be rotated with respect to the mounting block 24. In the embodiment shown in FIGS. 2 and 3, at least one guide pin 28 is used to attach the mounting plate 14 and back plate 16 to the mounting block. The guide pin 28 acts as a hinge so as to permit the mounting plate 14 (and attached magnet body 12), as well as the back plate, to be pivoted or rotated with respect to the mounting block 24. This permits the entire electromagnetic braking system 10 to be pivoted away from the disc or rail to allow for maintenance to be performed on the braking system and/or the disc/rail.

The pinned attachment also permits the magnet body 12 and back plate 16 to float with respect to the moving component. As will become apparent, this mounting arrangement permits the back plate 16 to move away from the moving component when the brake is released and move toward the moving component when the brake is activated.

In order to prevent the mounting plate 14 and back plate 16 from rotating during normal operation, the present invention incorporates a second guide pin 30. When both guide pins are installed, rotation of the electromagnetic brake system 10 is inhibited. When it is desired to rotate the electromagnetic brake system 10, the second guide pin 30 is removed. It is contemplated that the pins could, instead, be replaced with bolts or similar arrangements which would provide a suitable attachment.

The magnet body 12 includes an electrically controlled device for generating a magnetic field when activated. More particularly, the magnet body includes a recess 32 formed in one side. At least one coil 34 is positioned in the recess 32. Preferably, the recess 32 is annular in shape and the coil 34 is an annular ring mounted within the recess 32 and has a central axis 36. The coil 34 can be attached to the magnet body through any conventional mechanism such as with a potting adhesive. Electrical wires 38 extend out of the magnet body and connect to a power source through a controller 40. The controller 40 supplies power to the coil 34 as needed. For example, the controller 40 may be a computer (e.g., signal processor) that provides control of the power supplied based on programmed or sensed information. Alternatively, the controller may be a switch controller which supplies power (e.g., current) when activated (e.g., selected by a user.) The supply of power to the coil 34 creates a magnetic field about the coil 34. The invention also contemplates the use of a plurality of coils 34 mounted in one or more recesses. If more than one coil 34 is used in the invention, then the coils are preferably arranged so as to produce a substantially uniform magnetic field. For example, it may be desirable to arrange several coils 34 on the magnet body 12 spaced apart from one another in a circular pattern. The controller 40 can control the coils 34 independently or as a group depending on the arrangement of the coils 34 and the magnetic force desired.

The electromagnetic brake system 10 also includes an armature plate 42 which is positioned adjacent to the magnet body 12. The armature plate 42 is mounted to the magnet body 12 such that the armature plate 42 is permitted to float with respect to the magnet body 12. More particularly, one or more locating pins 44 position the armature plate 42 on the inner face of the magnet body 12. The locating pins 44 are mounted to the armature plate 42 and/or the magnet body 12 so as to permit the armature plate 42 a limited amount of motion with respect to the magnet body 12. Preferably, the armature plate 42 is permitted to move only axially (i.e., toward and away from the magnet body 12) with very limited or no rotational motion permitted (e.g., the armature plate 42 cannot rotate about the central axis 36.) Although pins are used in the illustrated embodiment, other type of locating devices can be used, such as bolts or guides. For example, the armature plate 42 and or the magnet body 12 can be formed with components that provide the locating and motion control that the pins provide while permitting the armature plate to float with respect to the magnet body 12.

As discussed above, the coil 34 generates a magnetic force or field when activated. The magnetic force operates to pull the armature plate 42 toward the magnet body 12 and away from the backing plate 16. In order to move the armature plate 42 away from the magnet body 12 and toward the back plate 16, the present invention incorporates at least one spring 46 between the magnet body 12 and the armature plate 42 which biases the armature plate 42 away from the magnet body 12. While a spring 46 is used in the preferred embodiment of the invention, other means for urging the armature plate 42 away from the magnet body 12 may be substituted. Those skilled in the art would readily be able to substitute such other devices and configurations into the present invention. Preferably there are a plurality of compression springs 46 located between the armature plate 42 and the magnet body 12. As will become apparent, the use of multiple compression springs 46 provides a safe and simple mechanism for separating the armature plate 42 from the magnet body 12. Thus, if one spring fails, the armature plate 42 will still be biased away from the magnet body 12 by the remaining springs 46. In the embodiment shown in FIG. 3, there is one compression spring 46 mounted in the center of the magnet body 12. The compression spring (or springs) 46 must apply sufficient force to the armature plate 42 such that the desired degree of braking is provided. The amount of spring force will vary depending on how the braking system is being used.

In one prototype application of the invention, a spring force of 1000 lbf was used. In two other embodiments the spring force was 2000 lbf and 6300 lbf. It is contemplated that the present invention can readily be manufactured with a suitable spring force from about 100 lbf and higher. The minimum size of the magnet is typically determined by selecting a coil with a number of ampturns that can be achieved through steel depending on the desired spring force and the air gap between the armature plate and the magnet body.

Each compression spring 46 is preferably partially disposed within a recess 48 formed in either the magnet body or the armature plate. However, as will be readily apparent, at least a portion of the compression spring 46 protrudes out of the recess 48 so as to maintain the armature plate 42 spaced apart from the magnet body 12 when the magnet body 12 is not magnetically energized. When energy is supplied to the magnet body 12 so as to activate the coil 34, the magnetic field generated opposes the biasing force applied by the springs and, thus, forces the armature plate to move toward the magnet body. Hence, the activation/ deactivation of the coil 34 in combination with the spring 46 causes the armature plate to move toward and away from the inner face of the magnet body 12.

Brake shoes 50 are mounted to the inner facing surfaces of the armature plate 42 and the back plate 16, respectively, so that the brake shoes 50 face one another. The brake shoes 50 each have frictional material formed on at least a portion of the brake shoe 50. The frictional material is conventional in the art and, thus, no further discussion is needed. Movement of the armature plate 42 toward the back plate 16 causes the frictional material on the brake shoes 50 to contact the rail or disc. As discussed above, the spring force generated by the springs must be sufficient to produce enough force of the brake shoes 50 on the moving rail or disc to slow and/or stop the disc/rail. As should be readily apparent the spacing between the brake shoes 50 should be sufficient to permit the rail/disc to move substantially unrestricted when the coil 34 is activated and the armature plate 42 is in its position located away from the back plate 16.

Figure 4:
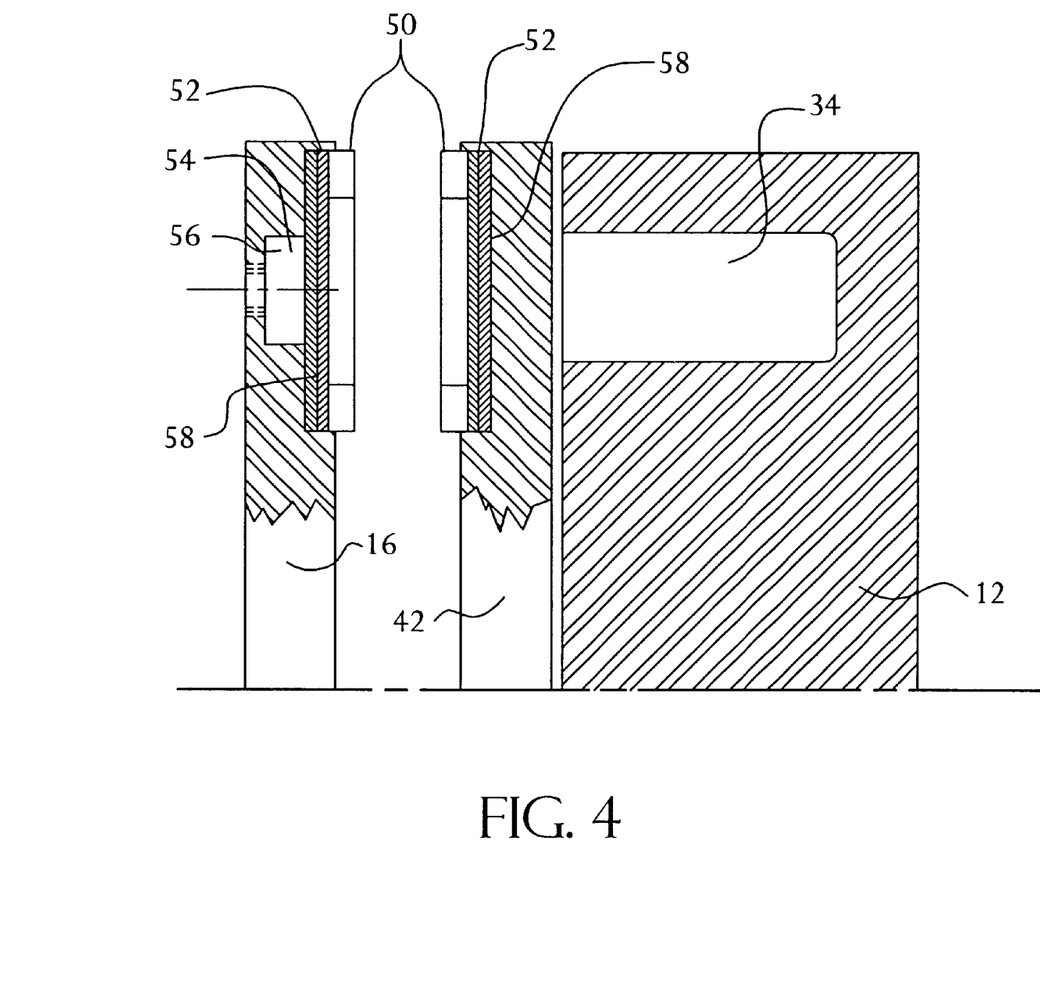
FIG. 4 is a partial cross-sectional view illustrating the mounting of the brake shoes to the armature plate and the back plate.

FIG. 4 is a cross-sectional view of one embodiment of the present invention illustrating the mounting of the brake shoes 50 to the armature plate 42 and back plate 16. As shown, recesses 52 are formed in the armature plate 42 and back plate 16 into which the brake shoes are placed. In the preferred embodiment, the brake shoe 50 on the armature plate 42 is not physically attached. Instead, the brake shoe 50 sits within the recess 52. When the coil 34 is activated, the magnetic force maintains the brake shoe 50 in the recess 52. When the coil 34 is not activated, the brake shoe is held in the recess 52 by the contact between the rail/disc and the brake shoe 50. Thus, when it is desired to perform maintenance of the brake shoe, the coil is deactivated allowing the brake shoe 50 on the armature plate 16 to be readily removed or adjusted by hand.

The brake shoe 50 on the back plate 16 is preferably held in plate by a second magnetic force. The second magnetic force is preferably generated by one or more permanent magnets 54 mounted to the back plate. As shown in FIG. 4, the permanent magnet 54 is mounted in a magnet recess 56. The magnetic force generated is sufficient to hold the brake shoe 50 in place during operation, yet still allow the brake shoe 50 to be removed by hand when it is desired to replace or adjust the brake shoe 50. Any conventional permanent magnet may be used to retain the brake shoe 50 on the back plate 16.

In order to provide sufficient braking force it may be necessary at times to adjust the spacing between the brake shoes 50. This can be easily accomplished with the present invention by incorporating shims 58 in the recesses 52 in between the brake shoes 52 and the back plate 16 and armature plate 42.

Figure 5:
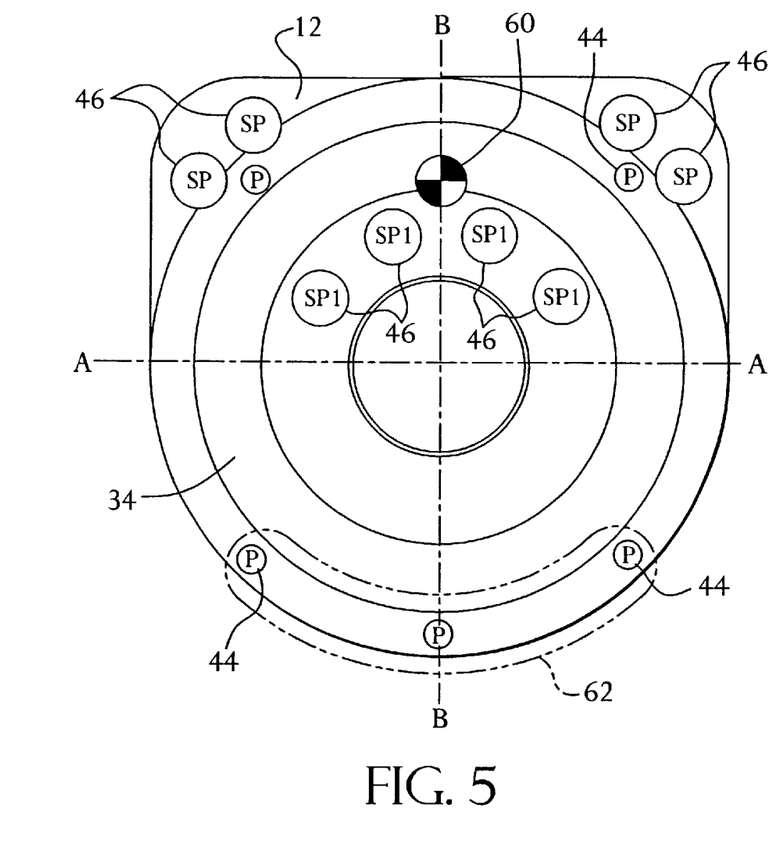
FIG. 5 is a back view of the magnet body in one embodiment of the invention illustrating the location of the springs.
Figure 6:
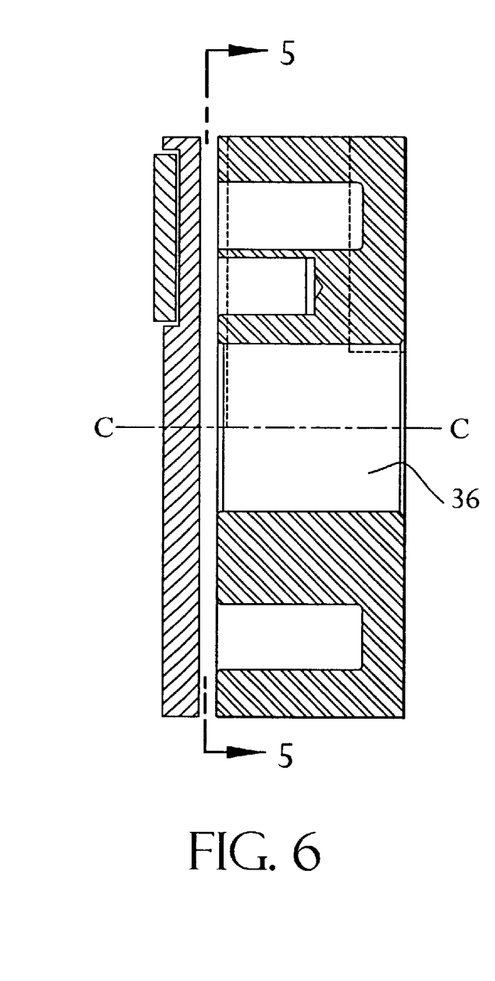
FIG. 6 is a cross-sectional view of one embodiment of the brake system according to the present invention.

An alternate embodiment of the present invention is shown in FIGS. 5 and 6. In this embodiment, multiple springs 46 are used to provide the desired spring force. FIG. 5 illustrates the inner face of the magnet body 12. In this embodiment, eight springs 46 are mounted within recesses in the magnet body 12. The springs are mounted so as to generate a combined spring force that has a centroid 60 located at a position offset from the central or longitudinal axis 36 of the coil 34 (i.e., the central axis of the magnetic force generated when the coil 34 is activated.) The centroid 60 of the springs 46 is preferably located on the magnet body 12 approximately at or near the location of the brake shoe 50 on the armature plate 42 such that the spring force is generated close to the brake shoe 50.

Figure 7A:
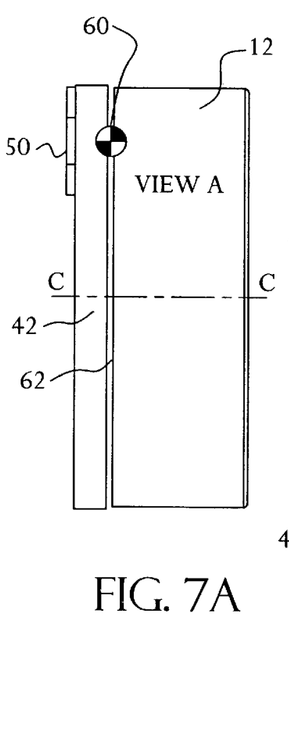
FIGS. 7A–7E 7A, 7B, 7C, 7D and 7E are schematic illustrations tof he movement of the armature plate with respect to the magnet body according to one embodiment of the present invention.

In the configuration of the invention shown in FIGS. 5 and 6, the armature plate 42 moves toward and away from the magnet body 12 in a unique manner. More particularly and with reference to FIGS. 7A through 7E, the motion of the armature plate 42 with respect to the magnet body 12 is shown schematically. FIG. 7A illustrates the armature plate 42 in its position when the coil is not activated. The springs maintain an air gap 62 between the armature plate 42 and the magnet body 12. In this position, the brake shoe 50 is positioned against the disc or rail.

Figure 7B:
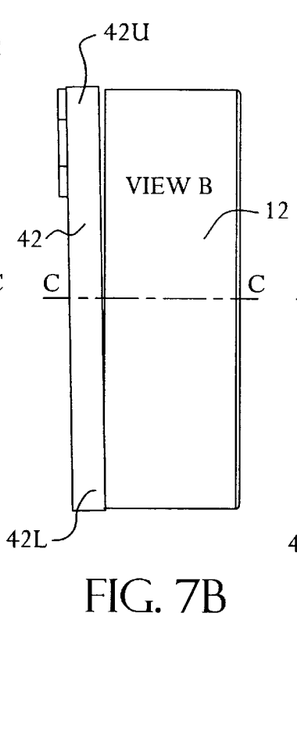

FIG. 7B illustrates the position of the armature plate 12 when the coil 34 is first activated. The magnetic force pulls the lower end 42L of the armature plate 42 toward the magnet body 12 first since the spring force is concentrated at the upper end of the armature plate 42U at the centroid 60.

Figure 7C:
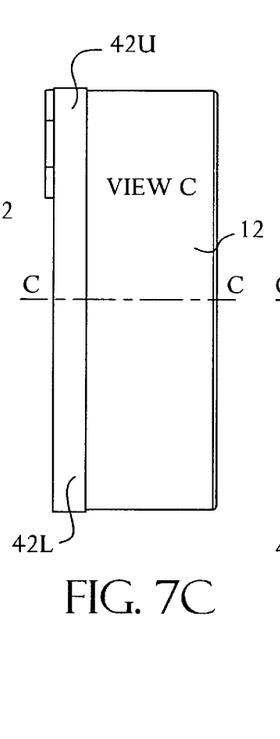

The continued activation of the coil 34 eventually overcomes the spring force generated by the springs and pulls the upper end of the armature plate 42U toward the magnet body 12, pulling the brake shoe 50 away from the disc/rail and, thus, disengaging the brake. This is shown in FIG. 7C.

Figure 7D:
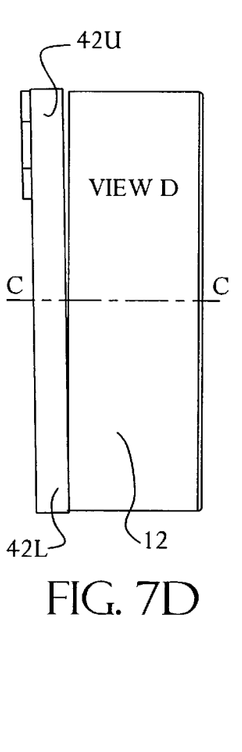
Figure 7E:
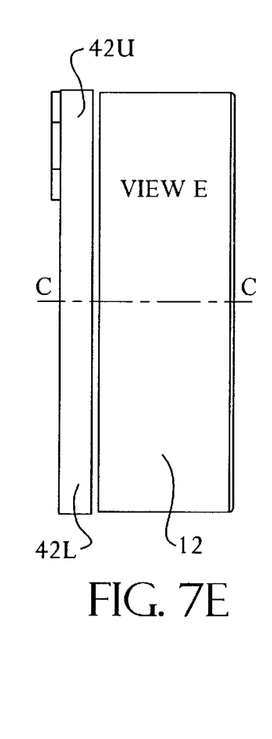

FIG. 7D shows the position of the armature plate 42 when the coil is initially deactivated (i.e., the magnetic force is no longer generated.) The spring force acts against the armature plate 42 at first, pushing the upper portion 42U of the armature plate away from the magnet body 12. Eventually, the lower portion 42L of the armature plate 42 will also move away from the magnet body 12 as shown in FIG. 7E.

It has also been determined that once the brake is completely disengaged (i.e., in the position shown in FIG. 7C), the magnetic energy required to hold the armature plate 42 against the magnet body 12 can be reduced. This occurs because the air gap between the armature plate 42 and the magnet body 12 is reduced and/or eliminated when the coil is activated. The presence of an air gap tends to produce magnetic energy loss. By reducing the air gap, the magnetic energy needed to maintain the armature plate 42 in its position close to the magnet body 12 is reduced. As such, while the brake is disengaged, energy can be conserved by utilizing less electromagnetic energy. One method of accomplishing this is to use two devices for generating the magnetic force between the armature plate 42 and the magnet body 12. The first electromagnetic device (e.g., the primary coil) produces a high current electromagnetic field for drawing the armature plate 42 toward the magnet body 12. Once this is done and the armature plate 42 is in the position shown in FIG. 7C, a second electromagnetic device is turned on (while the first device is still on). The second device utilizes less current to generate a magnetic force (and, therefore, less energy) than the first device. The first electromagnetic device is then turned off (deactivated.)

It is also contemplated that the present invention could be operated with two coils that, when activated simultaneously, produce a combined magnetic force to move the armature plate 42 toward the magnet body 12. One coil would then be deactivated to maintain the armature plate 42 in its disengaged position. In yet a further embodiment, the amount of current sent to the coil can be controlled (for example, with the controller discussed above) to vary the force of the magnetic field generated by the coil as needed.

In order to minimize the noise generated by the armature plate 42 contacting the magnet body 12, one or more shims 62 may be added between the two components. FIG. 6 illustrates in phantom the preferred location of the shim 62. The shim 62 also reduces the holding voltage (i.e., the reduced voltage necessary to maintain the armature plate 42 in the disengaged position shown in FIG. 7E) by as much as 50%. Various thickness shims can be used. One preferred range of shims is between 0.004 inches and 0.010 inches. Also, by incorporating a component to maintain or vary the air gap between the magnet body 12 and the armature plate 42, the magnetic force necessary to overcome the spring force to release the armature plate 42 from magnet body 12 is reduced.

Figure 8:
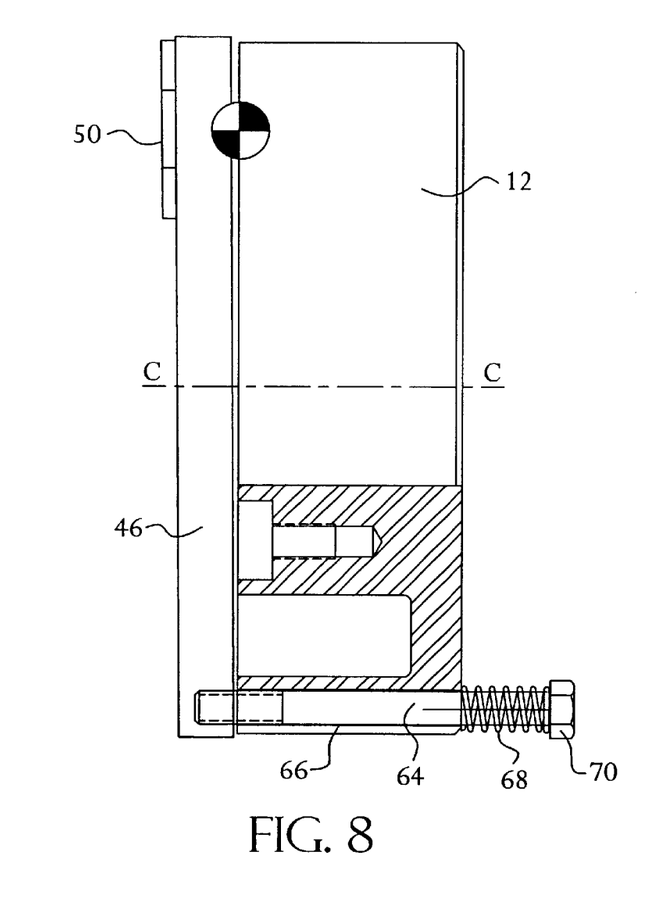
FIG. 8 is a partial sectional view of one embodiment of the present invention illustrating an air gap adjustment mechanism.

FIG. 8 illustrates an alternate mechanism for reducing the noise generated by the armature plate 42 contacting the magnet body 12. In this embodiment, the air gap between the armature plate 42 and the magnet body 12 is reduced by means of a spring mounted bolt assembly. More particularly, an adjustment bolt 64 is slidingly disposed within a hole 66 in the magnet body 12. The bolt is threaded into the armature plate 42 at a location spaced apart from the brake shoes 50, preferably on the opposite end of the armature plate 42 as shown. A spring 68 is located between the head 70 of the bolt and the magnet body 12 and urges the bolt head 70 away from the magnet body 12. This causes the bolt 64 to pull the lower end of armature plate 42 toward the magnet body, closing up the air gap. Adjustment of the spacing is provided by tightening and loosening the bolt 64. During normal operation, the movement of the armature plate 42 causes the adjustment bolt 64 to slide within the hole 66. The spring 68 limits the movement of the armature plate 42 away from the magnet body 12.

In order to facilitate maintenance and to permit controlled release of the braking system during loss of power (and, hence, the magnetic field), the present invention preferably incorporates a manual release mechanism. Referring back to FIGS. 3 and 4, one embodiment of the manual release mechanism is shown. In this embodiment, the manual release mechanism includes at least one manual release bolt 72 slidably disposed in a hole 74 that extends through the magnet body 12. The manual release bolt 72 has a threaded end 76 that is adapted to engage with mating threads formed in the armature plate 42. During normal operation, the manual release bolt 72 is preferably not located within the hole 74. When it becomes necessary to lock the armature plate 42 to the magnet body 12, such as during maintenance or when manual release of the brake system is desired, the manual release bolt 72 is placed within the hole 74 and threaded into the armature body 42. Tightening of the bolt causes the armature body 42 to move toward the magnet body 12, thus releasing the brake shoe 50 from contact with the disc/rail.

Figure 9:
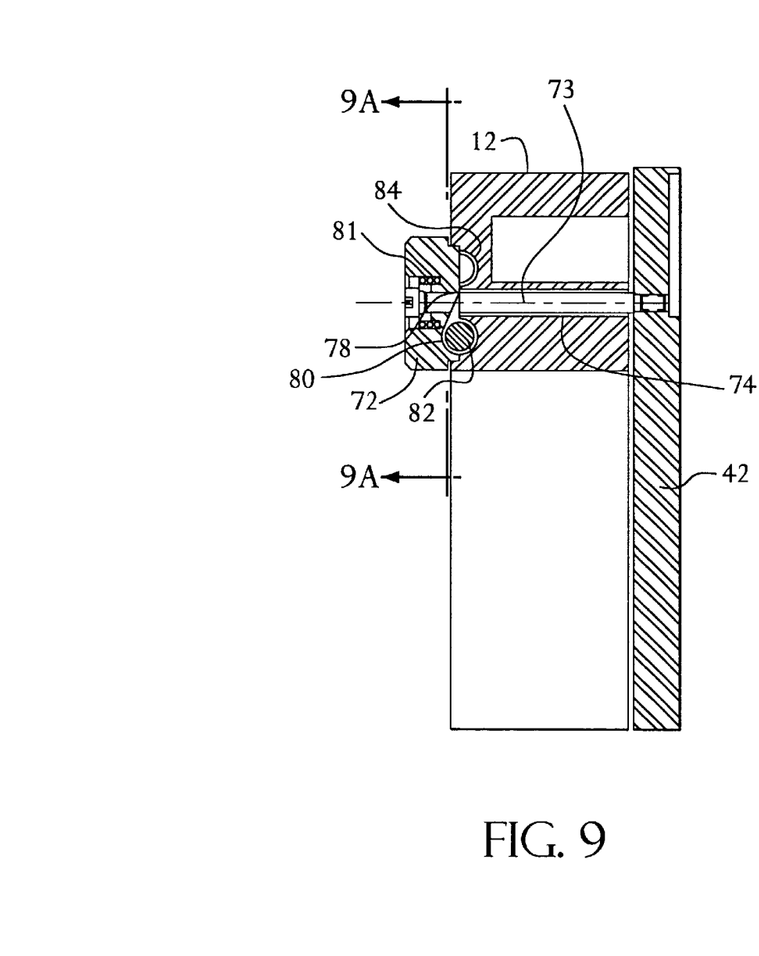
FIG. 9 is a partial sectional view of another embodiment of the present invention illustrating a manual release mechanism.
Figure 9A:
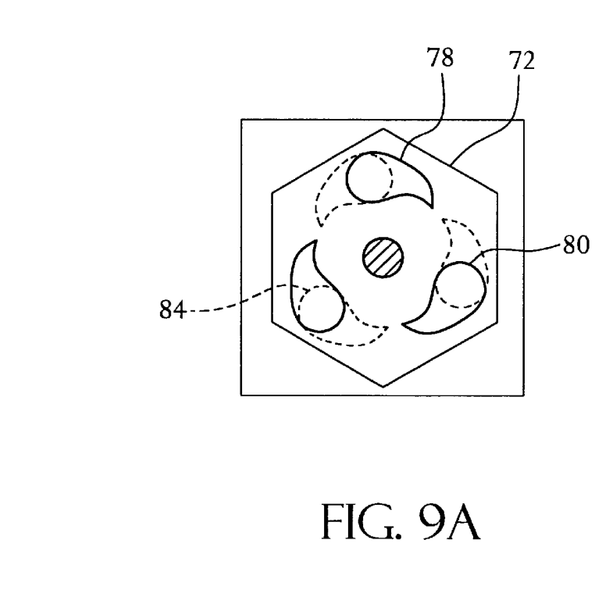
FIG. 9A is a bottom view of a bolt head illustrating channels and ball pockets formed in the head.

An alternate manual brake release mechanism is shown in FIGS. 9 and 9A. In this embodiment, a manual release bolt 72 is again located within a hole 74 that extends through the magnet body 12. The bolt 72 is threaded into the armature plate 42. The manual release bolt has at least one and, more preferably, three curved tapered channels 78 that feed into ball pockets 80 formed in the head of the bolt. The ball pockets 80 operate as seats for balls 82. Complimentary shaped ball pockets 84 are formed in the magnet body 12 adjacent to the bolt head. The pockets 80, 84 are formed such that when the ball 82 sits in both seats, the armature plate 42 is permitted to float with respect to the magnet body 12 (i.e., the magnetic fields and springs control the motion of the armature plate 42.) A spring 81 is located between the bolt head 72 and a shaft 73 and urges the bolt head 72 toward the magnet body 12. When it is desired to service the brake shoes 50, or in the event of a power failure when it is desired to release the brake, the bolt 72 is rotated such that the balls 82 roll along the associated channels. As a consequence of the taper in the channels, the balls force the bolt head 72 away from the magnet body 12. Since the bolt is threaded into the armature plate 42, the armature plate 42 is pulled away from the movable component and into contact with the magnet body 12. Thus, with use of a conventional wrench, the braking system can be released when needed. To provide additional displacement, grooves can also be formed in the magnet body (shown in dashed lines in FIG. 9A.)

Figure 10:
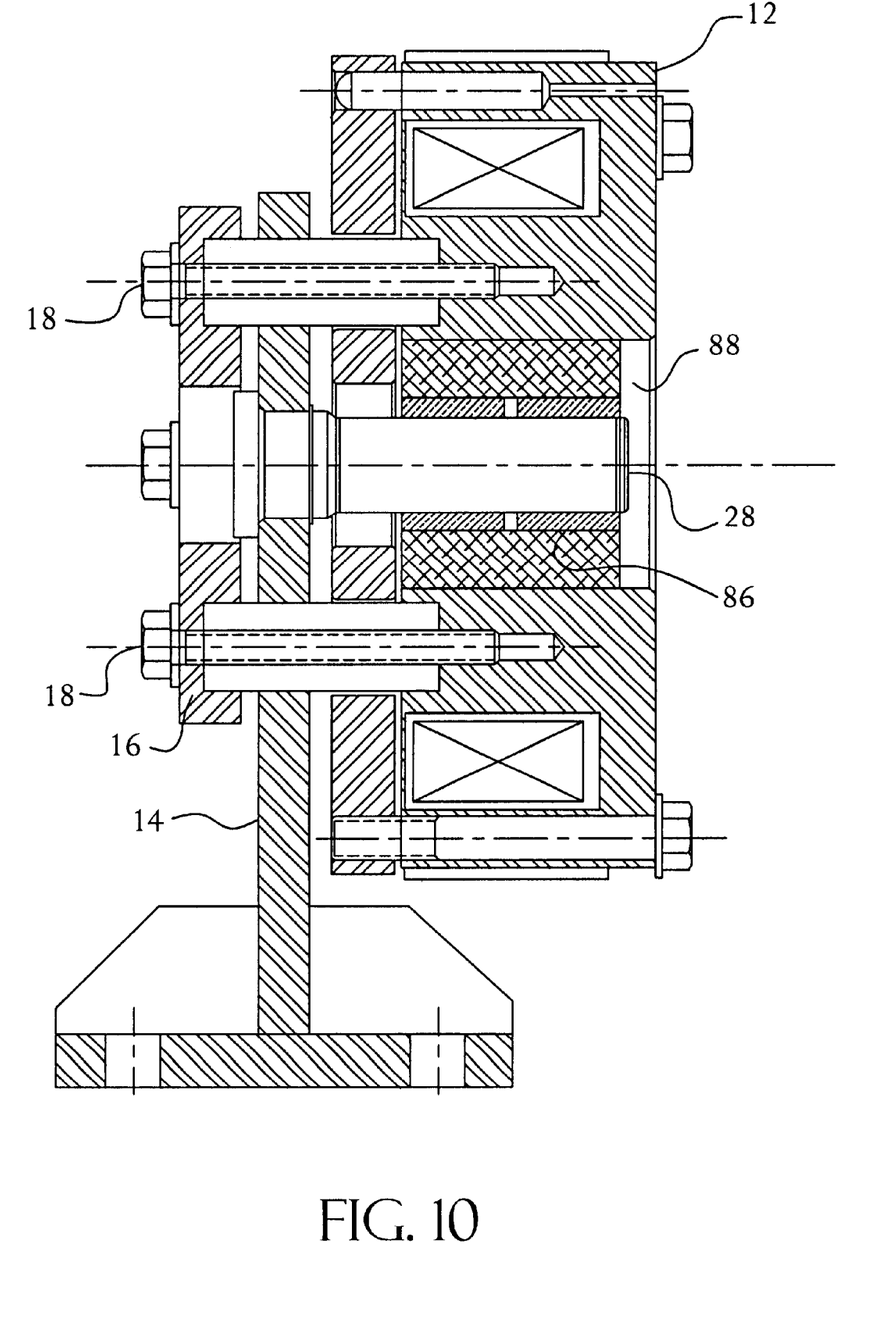
FIG. 10 is a cross-sectional view of another embodiment of the present invention.

An alternate embodiment of the braking system is shown in FIG. 10. In this embodiment of the invention, the mounting plate 14 is mounted on the same side of the magnet body 12 as the back plate 16. A plurality of bolts 18 attach the magnet body 12 to the back plate 16. One or more guide pins (or rods) 28 support the magnet body 12 and the back plate 16 on the mounting plate 14. In order to allow the magnet body 12 to move axially, a bushing 86 is located between the guide pin 28 and a sleeve 88 mounted within the magnet body 12. The sleeve 88 is preferably press fit into the magnet body 12 and configured to provide bearing support for the guide pin 28. The sleeve is preferably made from a non-magnetic material, such as aluminum. The bushing 86 is mounted to the sleeve 88 and preferably made from a low friction material, such as bronze or non-metallic materials.

The back plate 16 can be made from any suitable material, such as steel or aluminum. Aluminum material is preferably since magnetic energy tends to create drag on a steel backplate which can hold the frictional material of the brake shoe against the disc. By using aluminum, the drag is practically eliminated.

The brake system described above provides a unique mechanism for controlling the braking of a rotating or translating component by combining the use of a spring-actuated brake assembly with an electromagnetic brake release assembly. As such, the present invention provides a braking system that automatically engages the brake in the event of a power loss. This is extremely important in vehicles that travel at high speeds, such as elevators and amusement rides, which need to be stopped in the event of a power loss.

The novel configuration of the present invention permits it to be mounted at any position around the movable component. Also, as shown in FIG. 1, the present invention is configured to allow multiple brakes to be mounted around a common moving component, such as a rotating disc.

The present invention may be embodied in other specific forms without departing from the spirit or essential attributes thereof and, accordingly, reference should be made to the appended claims, rather than to the foregoing specification, as indicating the scope of the invention.

What is claimed is:

1. An electromagnetic brake system for controlling motion of a movable component, the brake system comprising:
    a support;
    a magnet body mounted to the support and having at least one coil mounted thereon which is adapted to generate an electromagnetic field when activated;
    a back plate mounted adjacent to and engaged with the magnet body;
    an armature plate located adjacent to the magnet body and adapted to be positioned between the magnet body and the movable component, the armature plate having a first side located adjacent to the at least one coil, and a second side adapted to be located adjacent to a portion of the movable component, the armature plate being movable relative to the magnet body;
    a brake shoe located on the second side of the armature plate; and
    at least one spring on the magnet body between the magnet body and the armature plate for biasing the armature plate away from the magnet body, the at least one spring having a spring force that is less than the force of the electromagnetic field that is capable of being generated on the armature plate by the at least one coil such that activation of the coil moves the armature plate toward the magnet body overcoming the spring force.

2. An electromagnetic brake system according to claim 1 wherein there are a plurality of springs on the magnet body, each spring located within a recess in the magnet body, and wherein the combined spring force produced by the plurality of springs is less than the force of the electromagnetic field that is capable of being generated on the armature plate by the at least one coil.

3. An electromagnetic brake system according to claim 2 wherein the plurality of springs are located on the magnet body such that they have a centroid that is located spaced apart from a center of the magnetic field generated by the coil.

4. An electromagnetic brake system according to claim 2 wherein the plurality of springs are located on the magnet body such that they have a centroid that is located proximate to the brake shoe.

5. An electromagnetic brake system according to claim 2 wherein the electromagnetic field generated has an outer pole and an inner pole and wherein at least one spring is located radially outward from the outer pole.

6. An electromagnetic brake system according to claim 1 wherein the magnet body is pivotally mounted to the support, the system further comprising means for releasably locking the magnet body to the support for preventing pivoting of the magnet body on the support.

7. An electromagnetic brake system according to claim 6 wherein the means for releasably locking the magnet body to the support is a removable pin.

8. An electromagnetic brake system according to claim 1 further comprising a second brake shoe mounted on the back plate and facing the brake shoe on the armature plate.

9. An electromagnetic brake system according to claim 8 further comprising a magnet mounted to the back plate, the magnet generating a magnetic force which retains the second brake shoe on the back plate.

10. An electromagnetic brake system according to claim 1 further comprising a shim located between the magnet body and the armature plate for preventing at least a portion of the armature plate from contacting the magnet body.

11. An electromagnetic brake system according to claim 1 further comprising at least one spacer located between the back plate and the magnet body for adjusting the spacing between the back plate and the magnet body.

12. An electromagnetic brake system according to claim 11 wherein the spacer includes a screw for adjusting the spacing.

13. An electromagnetic brake system according to claim 1 wherein the at least one coil is annular in shape.

14. An electromagnetic brake system according to claim 1 further comprising means for varying the magnetic force to reduce the magnetic force applied to the armature plate when the armature plate is in a position where the brake system is released.

15. An electromagnetic brake system according to claim 1 wherein there are at least two coils, the two coils producing a combined magnetic force sufficient to overcome the spring force, and wherein one coil is deactivated when the armature plate is in a position where the brake system is released.

16. An electromagnetic brake system according to claim 1 wherein the brake system is mounted to an elevator car and wherein the movable component is a rail that the elevator car translates relative to.

17. An electromagnetic brake system according to claim 1 further comprising at least one manual release mechanism extending through the magnet body and adapted to engage the armature plate for translating the armature plate toward the magnet body.

18. An electromagnetic brake system according to claim 17 wherein the at least one manual release mechanism includes a bolt adapted to be threaded into the armature plate such that rotation of the bolt when engaged causes the armature plate to translate toward the magnet body.

19. An electromagnetic brake system according to claim 1 further comprising at least one manual release bolt extending through the magnet body and attached to the armature plate for translating the armature plate toward the magnet body, the manual release bolt having a bolt head located adjacent to an outside surface of the magnet body, a plurality of balls are located in tapered channels between the bolt head and the magnet body, and wherein rotation of the bolt head causes the balls to roll within the channels and urge the bolt head away from the magnet body.

20. An electromagnetic brake system for controlling motion of a movable component, the brake system comprising:

a support;

a magnet body mounted to the support and having at least one electrically controlled magnet mounted thereon, the magnet adapted to generate a magnetic force when activated;

a back plate mounted adjacent to the magnet body and adapted to be positioned on one side of a movable component;

an armature plate located adjacent to the magnet body and adapted to be positioned between the magnet body and the movable component on the opposite side of the movable component from the back plate, the armature plate having a first side located adjacent to the magnet, and a second side adapted to be located adjacent to a portion of the moving component, the armature plate being movable relative to the magnet body;

a brake shoe located on the second side of the armature plate; and at least one spring on the magnet body between the magnet body and the armature plate for biasing the armature plate away from the magnet body, the at least one spring having a spring force that is less than the magnetic force capable of being generated by the magnet on the armature plate such that activation of the magnet moves the armature plate toward the magnet body overcoming the spring force.

21. An electromagnetic brake system according to claim 20 wherein there are a plurality of springs on the magnet body, each spring located within a recess in the magnet body, and wherein the combined spring force produced by the plurality of springs is less than the magnetic force generated by the at least one coil such that activation of the at least one coil causes the armature plate to move toward the magnet body overcoming the spring force.

22. An electromagnetic brake system according to claim 21 wherein the plurality of springs are located on the magnet body such that they have a centroid that is located spaced apart from a center of the magnetic field capable of being generated by the magnet.

23. An electromagnetic brake system according to claim 21 wherein the plurality of springs are located on the magnet body such that they have a centroid that is located approximately at a center of the brake shoe.

24. An electromagnetic brake system according to claim 20 wherein the magnet body is pivotally mounted to the support, the system further comprising means for releasably locking the magnet body to the support for preventing pivoting of the magnet body on the support.

25. An electromagnetic brake system according to claim 24 wherein the means for releasably locking the magnet body to the support is a removable pin.

26. An electromagnetic brake system according to claim 20 further comprising a second brake shoe mounted on the back plate and facing the brake shoe on the armature plate.

27. An electromagnetic brake system according to claim 26 further comprising a magnet mounted to the back plate for generating a magnetic force on the second brake shoe which retains the second brake shoe on the back plate.

28. An electromagnetic brake system according to claim 20 further comprising a shim located between the magnet body and the armature plate for preventing a portion of the armature plate from contacting the magnet body.

29. An electromagnetic brake system according to claim 20 further comprising at least one adjustable spacer located between the back plate and the magnet body for adjusting the spacing between the back plate and the magnet body.

30. An electromagnetic brake system according to claim 20 wherein the magnet is annular in shape.

31. An electromagnetic brake system according to claim 20 further comprising means for varying the magnetic force to reduce the magnetic force applied to the armature plate when the armature plate is in a position where the brake system is released.

32. An electromagnetic brake system according to claim 20 wherein the magnet comprises at least two coils, the two coils producing a combined magnetic force sufficient to overcome the spring force, and wherein one coil is deactivated when the armature plate is in a position where the brake system is released.

33. An electromagnetic brake system according to claim 20 wherein the brake system is mounted to an elevator car and wherein the movable component is a rail that the elevator car translates relative to.

34. An electromagnetic brake system according to claim 20 wherein the brake system is mounted to support structure and wherein the movable component is a rotating disc.

35. An electromagnetic brake system according to claim 20 further comprising at least one manual release mechanism extending through the magnet body and adapted to engage the armature plate for translating the armature plate toward the magnet body.

36. An electromagnetic brake system according to claim 20 further comprising at least one manual release bolt extending through the magnet body and attach ed to the armature plate for translating the armature plate toward the magnet body, the manual release bolt having a bolt head located adjacent to an outside surface of the magnet body, a plurality of balls are located in tapered channels between the bolt head and the magnet body, and wherein rotation of the bolt head causes the balls to roll within the channels and urge the bolt head away from the magnet body.

37. An apparatus comprising:

a first component;

a second component located adjacent to the first component, the first and second components capable of moving with respect to one another;

an electromagnetic brake system for preventing movement of the components with respect to one another comprising:

an electromagnetic device mounted on the first component adjacent to a first side of the second component and adapted to generate a magnetic force when activated;

a back plate mounted adjacent to a second side of the second component;

an armature plate located between the first side of the second component and the electromagnetic device and being translatable between the electromagnetic device and the second component;

a first brake shoe located on a side of the armature plate facing the second component;

a second brake shoe located on a side of the back plate facing the second component;

at least one spring on the first component for biasing the armature plate into contact with the second component, the spring having a spring force that is less than the magnetic force generated by the electromagnetic device such that activation of the electromagnetic device overcomes the spring force and moves the armature plate away from the second component.

38. An apparatus according to claim 37 wherein there are a plurality of springs on the first component, the springs having a combined spring force less than the magnetic force generated by the electromagnetic device such that activation of the electromagnetic device causes the armature plate to move toward the second component overcoming the spring force.

39. An apparatus according to claim 37 wherein the plurality of springs have a centroid that is located spaced apart from a center of the magnetic force generated by the electromagnetic device.

40. An apparatus according to claim 37 wherein the electromagnetic brake system is pivotally mounted to the first component and includes means for releasably locking the electromagnetic brake system to the first component for preventing pivoting of the electromagnetic brake system.

41. An apparatus according to claim 37 wherein the first brake shoe is held on the armature plate by the magnetic force generated by the electromagnetic device and wherein the second brake shoe is held on the back plate by a magnetic force generated by a second magnet located on the back plate.

42. An apparatus according to claim 37 further comprising at least one adjustable spacer located between the back plate and the electromagnetic device for adjusting the spacing between the back plate and the electromagnetic device.

43. An apparatus according to claim 37 wherein the electromagnetic device includes at least one electrically controlled coil.

44. An apparatus according to claim 43 wherein the magnetic force produced by the at least one coil is controlled by varying the current supplied to the coil, the magnetic force being reduced when the armature plate is in a position where the brake system is released.

45. An apparatus according to claim 37 wherein the electromagnetic device includes at least two coils, the two coils producing a combined magnetic force sufficient to overcome the spring force, and wherein one coil is deactivated when the armature plate is in a position where the brake system is released.

46. An apparatus according to claim 37 wherein the first component is a moving vehicle and wherein the second component is a rail upon which the moving vehicle translates.

47. An apparatus according to claim 37 wherein the second component is a rotating disc.

48. An apparatus according to claim 37 further comprising at least one manual release mechanism adapted to engage the armature plate for translating the armature plate away from the second component.

* * * * *